United States Patent
Hu et al.

(10) Patent No.: US 11,508,993 B2
(45) Date of Patent: Nov. 22, 2022

(54) ELECTRODE ASSEMBLY HAVING AN ELECTRODE SUBASSEMBLY, AND BATTERY INCLUDING THE ELECTRODE ASSEMBLY

(71) Applicant: Ningde Amperex Technology Ltd., Ningde (CN)

(72) Inventors: Qiaoshu Hu, Ningde (CN); Yi-Bo Zhang, Ningde (CN)

(73) Assignee: Ningde Amperex Technology Ltd., Ningde (CN)

( * ) Notice: Subject to any disclaimer, the term of this patent is extended or adjusted under 35 U.S.C. 154(b) by 356 days.

(21) Appl. No.: 16/695,590

(22) Filed: Nov. 26, 2019

(65) Prior Publication Data

US 2021/0005935 A1 Jan. 7, 2021

(30) Foreign Application Priority Data

Jul. 4, 2019 (CN) .......................... 201910600740.1

(51) Int. Cl.
| | |
|---|---|
| *H01M 10/0587* | (2010.01) |
| *H01M 10/0525* | (2010.01) |
| *H01M 4/02* | (2006.01) |

(52) U.S. Cl.
CPC ... *H01M 10/0587* (2013.01); *H01M 10/0525* (2013.01); *H01M 2004/025* (2013.01)

(58) Field of Classification Search
CPC ......... H01M 10/0587; H01M 10/0525; H01M 2004/025; H01M 2300/0025; H01M 2300/0085; Y02E 60/10; Y02P 70/50

(Continued)

(56) References Cited

U.S. PATENT DOCUMENTS

| | | |
|---|---|---|
| 6,280,873 B1 | 8/2001 | Tsukamoto |
| 2010/0143774 A1 | 6/2010 | Han et al. |
| 2018/0277843 A1* | 9/2018 | Yasuda ................. H01M 4/485 |

FOREIGN PATENT DOCUMENTS

| | | |
|---|---|---|
| CN | 1479396 A | 3/2004 |
| CN | 101609905 A | 12/2009 |

(Continued)

OTHER PUBLICATIONS

International Search Report dated Mar. 26, 2020, in connection with corresponding International Application No. PCT/CN2019/130945; 5 pages.

(Continued)

*Primary Examiner* — Gary D Harris
(74) *Attorney, Agent, or Firm* — Maier & Maier, PLLC

(57) ABSTRACT

An electrode assembly includes an electrode subassembly forming by winding a first electrode plate and a second electrode plate. The first electrode plate includes a first electrode plate unit. The first electrode plate unit includes a bipolar current collector, a first active layer, and a second active layer. The bipolar current collector is disposed between the first active layer and the second active layer. The first active layer is electrically connected to the second active layer. The second electrode plate includes a composite current collector, a third active layer, and a fourth active layer. The composite current collector is disposed between the third active layer and the fourth active layer. The third active layer is electrically insulated from the fourth active layer. The disclosure further provides a battery including the electrode assembly.

18 Claims, 10 Drawing Sheets

(58) Field of Classification Search
USPC .......................................................... 429/94
See application file for complete search history.

(56) References Cited

FOREIGN PATENT DOCUMENTS

| | | |
|---|---|---|
| CN | 202308207 U | 7/2012 |
| CN | 103035954 A | 4/2013 |
| CN | 103346356 A | 10/2013 |
| CN | 110556568 A | 12/2019 |
| JP | 2010073421 A | 4/2010 |

OTHER PUBLICATIONS

Chinese Office Action dated Jun. 4, 2021, in connection with corresponding CN Application No. 201910600740.1 (9 pp., including machine-generated English translation).

\* cited by examiner

ELECTRODE ASSEMBLY HAVING AN ELECTRODE SUBASSEMBLY, AND BATTERY INCLUDING THE ELECTRODE ASSEMBLY

FIELD

The present disclosure generally relates to batteries, more particularly to an electrode assembly and a battery including the same.

BACKGROUND

Due to a high energy density, small size, and light weight, lithium batteries are widely used in field of consumer electronics. With the rapid development in the fields of electric vehicles and mobile electronic devices, improvements of energy density, safety, and cycle performance of such a battery have become a great concern.

SUMMARY

What is needed, is an electrode assembly having a high energy density and a battery including the electrode assembly.

The present disclosure provides an electrode assembly. The electrode assembly includes an electrode subassembly including a first electrode plate and a second electrode plate. The electrode subassembly winds to form the electrode assembly. The first electrode plate includes a first electrode plate unit. The first electrode plate unit includes a bipolar current collector, a first active layer, and a second active layer. The bipolar current collector is disposed between the first active layer and the second active layer. The first active layer is electrically connected to the second active layer. The second electrode plate includes a composite current collector, a third active layer, and a fourth active layer. The composite current collector is disposed between the third active layer and the fourth active layer. The third active layer is electrically insulated from the fourth active layer.

In one embodiment, the electrode assembly further includes a sealing portion. The sealing portion seals sides of the electrode assembly.

In one embodiment, the electrode assembly further includes a first separator and a second separator. The first separator is disposed between the first electrode plate and the second electrode plate. The second separator is disposed on a surface of the first electrode plate away from the second electrode plate.

In one embodiment, the first electrode plate includes a plurality of first electrode plate units. The first separator is disposed between two adjacent first electrode plate units of the plurality of first electrode plate units.

In one embodiment, the second electrode plate is located on an outer side of the electrode assembly. The first active layer is farther away from the second electrode plate than the second active layer, and the fourth active layer is farther away from the first electrode plate than the third active layer. The second active layer has a polarity opposite to that of the third active layer.

In one embodiment, the first active layer has a same polarity as the third active layer, and the second active layer has a same polarity as the fourth active layer. The polarity of the first active layer is opposite to the polarity of the second active layer.

In one embodiment, the bipolar current collector includes a conducting layer, a first metallic layer, and a second metallic layer. The conducting layer is disposed between the first metallic layer and the second metallic layer. The composite current collector includes an insulating layer, a third metallic layer, and a fourth metallic layer. The insulating layer is disposed between the third metallic layer and the fourth metallic layer.

In one embodiment, the electrode assembly further includes a first terminal and a second terminal. The first terminal is disposed on the third metallic layer, and the second terminal is disposed on the fourth metallic layer.

In one embodiment, the electrode assembly further includes a first electrolyte layer and a second electrolyte layer. The first electrolyte layer is disposed between the first active layer and the fourth active layer, and the second electrolyte layer is disposed between the second active layer and the third active layer.

In one embodiment, the second electrode plate is located on an inner side of the electrode assembly, the first active layer is farther away from the second electrode plate than the second active layer, the fourth active layer is farther away from the first electrode plate than the third active layer, and the second active layer has a polarity opposite to that of the third active layer.

The present disclosure further provides a battery including an electrode assembly. The electrode assembly includes an electrode subassembly including a first electrode plate and a second electrode plate. The electrode subassembly are wound to form the electrode assembly. The first electrode plate includes a first electrode plate unit. The first electrode plate unit includes a bipolar current collector, a first active layer, and a second active layer. The bipolar is disposed between the first active layer and the second active layer. The first active layer is electrically connected to the second active layer. The second electrode plate includes a composite current collector, a third active layer, and a fourth active layer. The composite current collector is disposed between the third active layer and the fourth active layer. The third active layer is electrically insulated from the fourth active layer.

In one embodiment, the electrode assembly further includes a sealing portion. The sealing portion seals sides of the electrode assembly.

In one embodiment, the electrode assembly further includes a first separator and a second separator. The first separator is disposed between the first electrode plate and the second electrode plate. The second separator is disposed on a surface of the first electrode plate away from the second electrode plate.

In one embodiment, the first electrode plate includes a plurality of first electrode plate units. The first separator is disposed between any adjacent first electrode plate unit.

In one embodiment, the second electrode plate is located on an outer side of the electrode assembly. The first active layer is farther away from the second electrode plate than the second active layer, and the fourth active layer is farther away from the first electrode plat than the third active layer. The second active layer has a polarity opposite to that of the third active layer.

In one embodiment, the first active layer has a same polarity as the third active layer, the second active layer has a same polarity as the fourth active layer. And, the polarity of the first active layer is opposite to the polarity of the second active layer.

In one embodiment, the bipolar current collector includes a conducting layer, a first metallic layer, and a second metallic layer. The conducting layer is disposed between the first metallic layer and the second metallic layer. The composite current collector includes insulating layer, a third metallic layer, and a fourth metallic layer. The insulating layer is disposed between the third metallic layer and the fourth metallic layer.

In one embodiment, the electrode assembly further includes a first terminal and a second terminal. The first terminal is disposed on the third metallic layer, and the second terminal is disposed on the fourth metallic layer.

In one embodiment, the electrode assembly further includes a first electrolyte layer and a second electrolyte layer. The first electrolyte layer is disposed between the first active layer and the fourth active layer, and the second electrolyte layer is disposed between the second active layer and the third active layer.

In one embodiment, the second electrode plate is located an inner side of the electrode assembly, the first active layer is farther away from the second electrode plate than the second active layer, the fourth active layer is farther away from the first electrode plate than the third active layer, and the second active layer has a polarity opposite to that of the third active layer.

In the electrode assembly of the present disclosure, the electrode assembly includes the electrode subassembly formed by winding the first electrode plate and the second electrode plate. The first active layer of the first electrode plate is electrically connected to the second active layer of the first electrode plate, and the third active layer of the second electrode plate is electrically insulated from the fourth active of the second electrode plate to create a series connection inside the electrode assembly, thereby increasing the output voltage of the battery. Thus, the usage of the internal space of the battery is maximized to obtain a battery with a high energy density.

BRIEF DESCRIPTION OF THE DRAWINGS

Implementations of the present disclosure will now be described, by way of embodiments, with reference to the attached figures.

DETAILED DESCRIPTION

Figure 1:
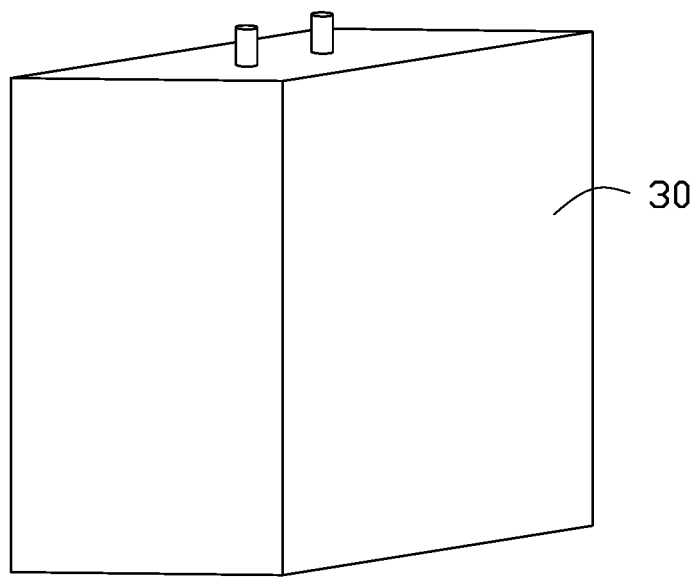
FIG. 1 is a view of an embodiment of a battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

Figure 2:
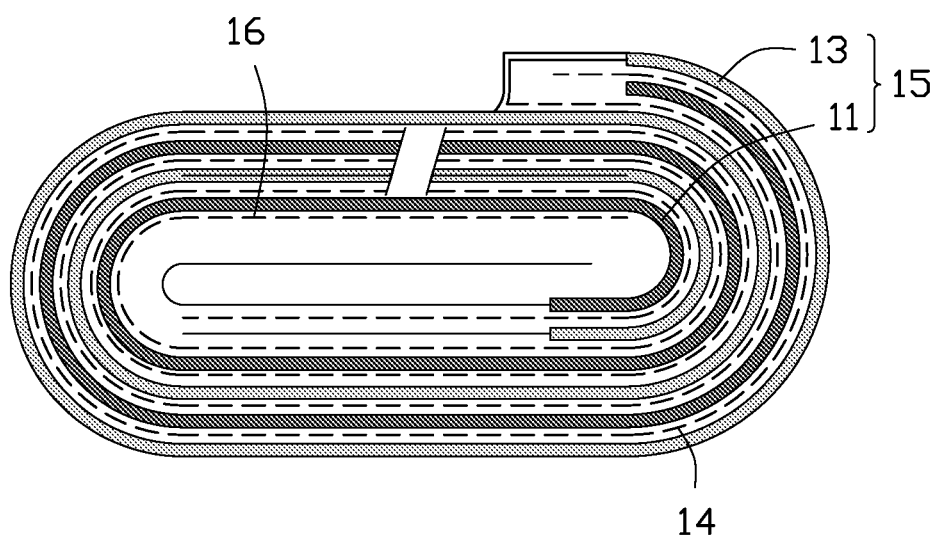
FIG. 2 is a top view of an electrode assembly of the battery in FIG. 1.

FIG. 1 and FIG. 2 illustrate an embodiment of a battery 100. The battery 100 includes an electrode assembly 10 and a housing 30. The electrode assembly 10 is received in the housing 30.

The electrode assembly 10 includes an electrode subassembly 15 including a first electrode plate 11 and a second electrode plate 13. The electrode subassembly 15 winds to form the electrode assembly 10.

Figure 3:
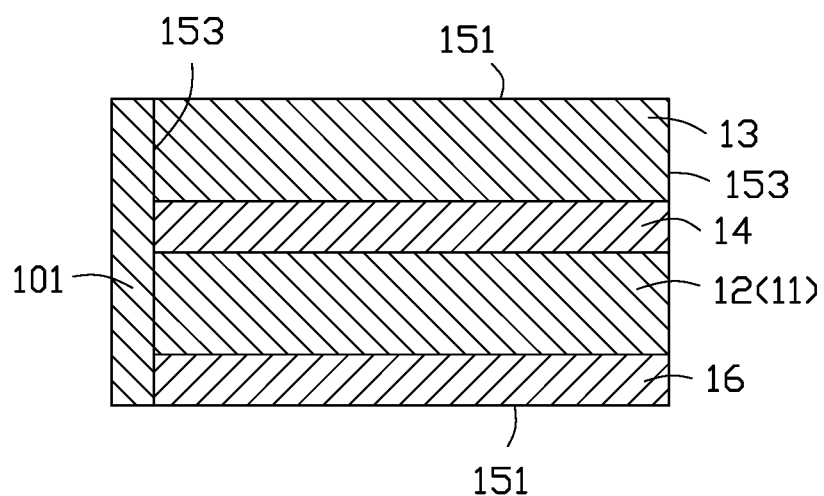
FIG. 3 is a cross-sectional view of a portion of an electrode subassembly of the electrode assembly in FIG. 2.
Figure 4:
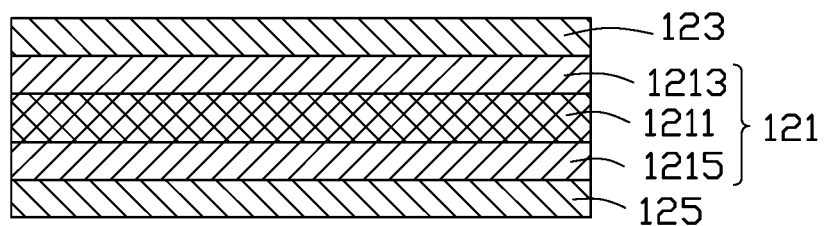
FIG. 4 is a cross-sectional view of a portion of a first electrode plate of the winding portion in FIG. 3.

Referring to FIGS. 3 and 4, the electrode assembly 10 further includes a sealing portion 101. The sealing portion 101 seals sides 153 of the electrode assembly 10. According to an embodiment of the present disclosure, the electrode subassembly 15 includes two main surfaces 151 (including an upper main surface and a lower main surface) and four sides 153. The sealing portion 101 seals the four sides 153, such that an internal reaction environment of the electrode subassembly 15 is isolated from an external environment outside the electrode subassembly 15.

The first electrode plate 11 includes a first electrode plate unit 12. The first electrode plate unit 12 includes a bipolar current collector 121, a first active layer 123, and a second active layer 125. That is, the first electrode plate unit 12 is a bipolar electrode plate. The bipolar current collector 121 is disposed between the first active layer 123 and the second active layer 125. The first active layer 123 is electrically connected to the second active layer 125.

In at least one embodiment, the bipolar current collector 121 includes a conducting layer 1211, a first metallic layer 1213, and a second metallic layer 1215. The conducting layer 1211 is disposed between the first metallic layer 1213 and the second metallic layer 1215, and the first active layer 123 is electrically connected to the second active layer 125. The first active layer 123 is disposed on the first metallic layer 1213, and the second active layer 125 is disposed on the second metallic layer 1215. According to an embodiment of the present disclosure, the conducting layer 1211 can be a conducting polymeric film.

The electrode assembly 10 further includes a first separator 14 and a second separator 16. The first separator 14 is disposed between the first electrode plate 11 and the second electrode plate 13. The second separator 16 is disposed on a surface of the first electrode plate 11 opposite to the second electrode plate 13.

In another embodiment, the first electrode plate 11 includes a plurality of the first electrode plate units 12 which are stacked. The first separator 14 is disposed between adjacent first electrode plate units 12.

Figure 6:
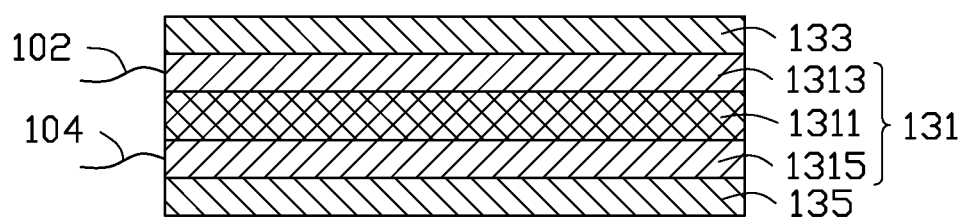
FIG. 6 is a cross-sectional view of a portion of a second electrode plate of the electrode subassembly in FIG. 3.

Referring to FIG. 6, the second electrode plate 13 includes a composite current collector 131, a third active layer 133, and a fourth active layer 135. The composite current collector 131 is disposed between the third active layer 133 and the fourth active layer 135. The third active layer 133 is electrically insulated from the fourth active layer 135.

The composite current collector 131 includes an insulating layer 1311, a third metallic layer 1313, and a fourth metallic layer 1315. The insulating layer 1311 is disposed between the third metallic layer 1313 and the fourth metallic layer 1315. The third active layer 133 is disposed on the third metallic layer 1313, and the fourth active layer 135 is disposed on the fourth metallic layer 1315. According to an embodiment of the present disclosure, the insulating layer 1311 can be a PET (polyethylene terephthalate) film.

Figure 7:
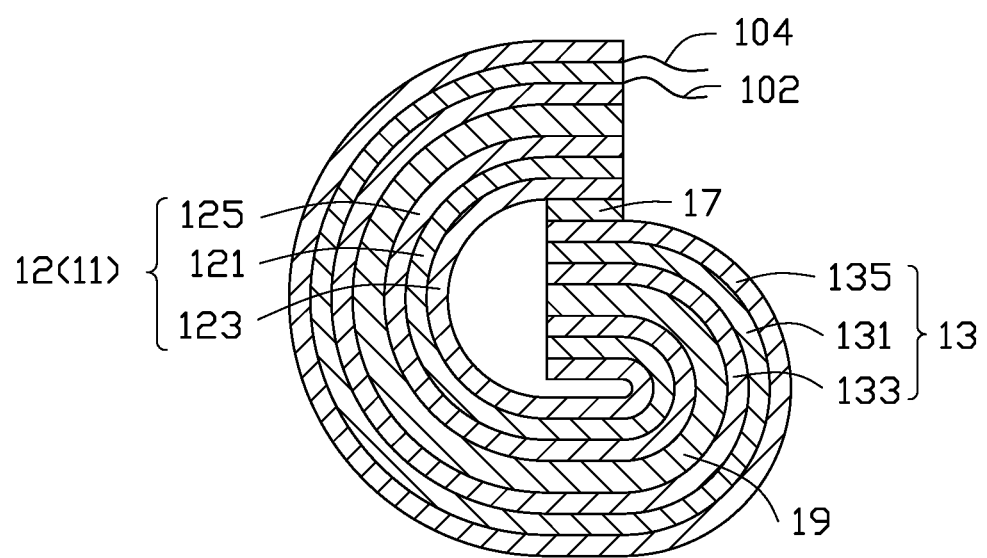
FIG. 7 is a cross-sectional view of another portion of an electrode subassembly in FIG. 2.

Referring to FIG. 7, in at least one embodiment, the second electrode plate 13 is located on an outer side of the electrode assembly 10 along a winding direction of the electrode subassembly 15. Along a thickness direction of the electrode subassembly 15, the first active layer 123 is farther away from the second electrode plate 13 than the second active layer 125, and the fourth active layer 135 is farther away from the first electrode plate 11 than the third active layer 133. The second active layer 125 has a polarity opposite to that of the third active layer 133. In another embodiment, the second electrode plate 13 is located on an inner side of the electrode assembly 10 along a winding direction of the electrode subassembly 15, and the winding direction of the electrode subassembly 15 is opposite to the winding direction of the electrode subassembly 15 shown in FIG. 7.

Referring to FIG. 6, the electrode assembly 10 further includes a first terminal 102 and a second terminal 104. The first terminal 102 is disposed on the third metallic layer 1313, and the second terminal 104 is disposed on the fourth metallic layer 1315.

Referring to FIGS. 6 and 7, in at least one embodiment, the first active layer 123 and the third active layer 133 are positive, and the second active layer 125 and the fourth active layer 135 are negative. When the battery 100 is charged, external electrons enter the fourth metallic layer 1315 from the second terminal 104. Because the fourth metallic layer 1315 is electrically insulated from the third metallic layer 1313, the external electrons cannot enter the third metallic layer 1313. Therefore, the external electrons can only reach the fourth active layer 135, and are further conducted to the first electrode plate 11 via the fourth active layer 135 in the way of ion conduction, and then are output via the first terminal 102. Thus, a current path of the battery 100 is stipulated by an arrangement of the first electrode plate 11 and the second electrode plate 13 in the electrode subassembly 15, thereby increasing an output voltage of the battery 100.

The electrode assembly 10 further includes a first electrolyte layer 17 and a second electrolyte layer 19. The first electrolyte layer 17 is disposed between the first active layer 123 and the fourth active layer 135, and the second electrolyte layer 19 is disposed between the second active layer 125 and the third active layer 133. According to an embodiment of the present disclosure, the first electrolyte layer 17 and the second electrolyte layer 19 are gel electrolytes. According to another embodiment of the present disclosure, the first electrolyte layer 17 and the second electrolyte layer 19 can be liquid electrolytes or solid electrolytes.

In the EMBODIMENTS and COMPARATIVE EMBODIMENTS herein, dimensions, materials, and proportions of electrode plates, separators, electrolytes, and the like are not limited, and may be selected according to actual needs.

Comparative Embodiment 1

Figure 8A:
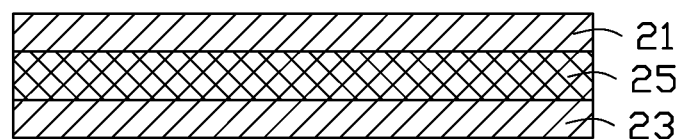
FIG. 8A is a cross-sectional view of COMPARATIVE EMBODIMENT 1 showing a portion of an electrode assembly.
Figure 8B:
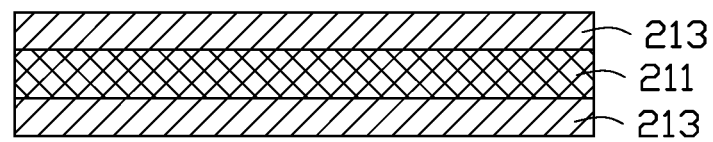
FIG. 8B is a cross-sectional view of a portion of a first negative electrode plate of the electrode assembly in FIG. 8A.
Figure 8C:
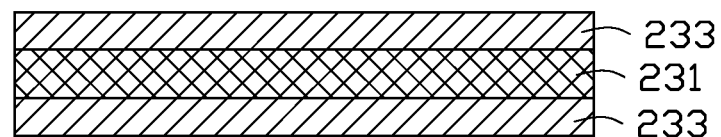
FIG. 8C is a cross-sectional view of a portion of a first positive electrode plate of the electrode assembly in FIG. 8A.
Figure 9A:
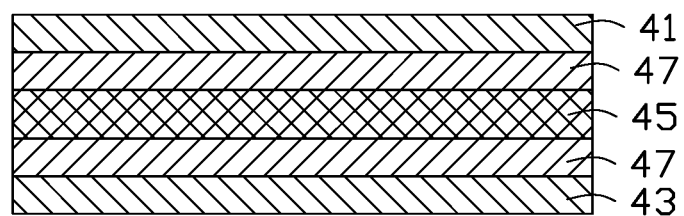
FIG. 9A is a cross-sectional view of COMPARATIVE EMBODIMENT 2 showing a portion of an electrode assembly.
Figure 9B:
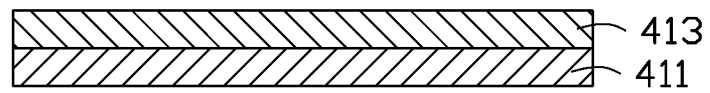
FIG. 9B is a cross-sectional view of a portion of a second negative electrode plate of the electrode assembly in FIG. 9A.
Figure 9C:
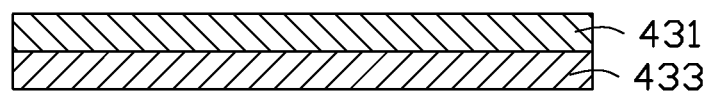
FIG. 9C is a cross-sectional view of a portion of a second positive electrode plate of the electrode assembly in FIG. 9A.
Figure 9D:
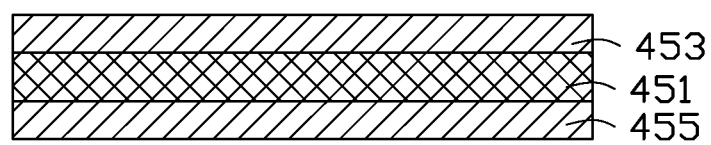
FIG. 9D is a cross-sectional view of a portion of a bipolar electrode plate of the electrode assembly in FIG. 9A.

FIGS. 8A, 8B, and 8C illustrate that the electrode assembly 20 includes a first negative electrode plate 21, a first positive electrode plate 23, and a separator 25. The separator 25 is disposed between the first negative electrode plate 21 and the first positive electrode plate 23. The first negative electrode plate 21 includes a first negative current collector 211 and a first negative active layer 213 disposed on a surface of the first negative current collector 211. The first positive electrode plate 23 includes a first positive current collector 231 and a first positive active layer 233 disposed on a surface of the first positive current collector 231.

In COMPARATIVE EMBODIMENT 1, the first negative current collector 211 is copper foil, and the first positive current collector 231 is aluminum foil.

In COMPARATIVE EMBODIMENT 1, methods for manufacturing the electrode assembly 20 and a battery including the same, are as follows:

Preparation of the first negative electrode plate 21: mixing a graphite, a conductive carbon black (Super P), a styrene butadiene rubber (SBR) at a weight ratio of 96:1.5:2.5. Adding deionized water as a solvent, stirring to form a slurry with a solid content of 0.7. Uniformly coating the slurry onto front and back surfaces of the first negative current collector 211, drying at 110° C. to form the first negative active layer 213. Then, cold pressing the product to a compacted density of 1.7 g/cm$^3$, thereby forming the first negative electrode plate 21. The weight of effective substance on the first negative current collector 211 is 95 g/m$^2$.

Preparation of the first positive electrode plate 23: mixing a lithium cobaltate (LiCoO$_2$), a conductive carbon black (Super P), and a polyvinylidene fluoride (PVDF) at a weight ratio of 97.5:1.0:1.5. Adding N-methyl pyrrolidone (NMP) as a solvent, stirring to form a slurry with a solid content of 0.75. Uniformly coating the slurry onto front and back surfaces of the first positive current collector 231, drying at 90° C. to form the first positive active layer 233. Then, cold pressing the product to a compacted density of 4.0 g/cm$^3$, thereby forming the first positive electrode plate 23. The weight of effective substance on the first positive current collector 231 is 180 g/m$^2$.

Selection of separator 25: a PE (polyethylene) film with a thickness of 15 μm is selected as the separator.

Preparation of the electrolyte: in a dry argon atmosphere, mixing an organic solvent including an ethylene carbonate (EC), an ethyl methyl carbonate (EMC), and a diethyl carbonate (DEC) at a mass ratio of 30:50:20. Then, mixing and uniformly dissolving a lithium hexafluorophosphate (LiPF$_6$) in the organic solvent to obtain the electrolyte. The concentration of LiPF$_6$ in the electrolyte is 1.15 M.

Preparation of the battery: stacking and winding the first positive electrode plate 23, the separator 25, and the first negative electrode plate 21 to form the electrode assembly 20, the separator 25 being disposed in the middle of the laminate. Then, sealing top and side edges of the electrode assembly 20, and filling the electrode assembly 20 with the electrolyte, and then encapsulating and formatting the electrode assembly 20 to obtain the battery. In the formation of the electrode assembly 20, the electrode assembly 20 is charged to 3.3 V with a constant current of 0.02 C, then the electrode assembly 20 is charged to 3.6 V with a constant current of 0.1 C. The output voltage of the battery is less than 4V.

Comparative Embodiment 2

FIGS. 9A, 9B, 9C, and 9D illustrate that the electrode assembly 40 including a second negative electrode plate 41, a second positive electrode plate 43, a bipolar electrode plate 45, and an separator 47. The bipolar electrode plate 45 is disposed between the second negative electrode plate 41 and the second positive electrode plate 43. The separator 47 is disposed between the second negative electrode plate 41 and the bipolar electrode plate 45, and the separator 47 is further disposed between the second positive electrode plate 43 and the bipolar electrode plate 45. The second negative electrode plate 41 includes a second negative current collector 411 and a second negative active layer 413 disposed on the second negative current collector 411. The second positive electrode plate 43 includes a second positive current collector 431 and a second positive active layer 433 disposed on the second positive current collector 431. The bipolar electrode plate 45 includes a current collector 451, a third negative active layer 453, and a third positive active layer 455. The current collector 451 is disposed between the third negative active layer 453 and the third positive active layer 455.

In COMPARATIVE EMBODIMENT 2, the second negative current collector 411 is copper foil, and the second positive current collector 431 is aluminum foil.

In COMPARATIVE EMBODIMENT 2, methods for manufacturing the electrode assembly 40 and a battery including the same, are as follows:

Preparation of the second negative electrode plate 41: mixing a graphite, a conductive carbon black (Super P), a styrene butadiene rubber (SBR) at a weight ratio of 96:1.5:2.5. Adding deionized water as a solvent, stirring to form a slurry with a solid content of 0.7. Uniformly coating the slurry onto a front surface of the second negative current collector 411, drying at 110° C. to form the second negative active layer 413. Then, cold pressing the product to a compacted density of 1.7 g/cm³, thereby forming the second negative electrode plate 41. The weight of effective substance on the second negative current collector 411 is 95 g/m².

Preparation of the second positive electrode plate 43: mixing a lithium cobaltate (LiCoO₂), a conductive carbon black (Super P), and a polyvinylidene fluoride (PVDF) at a weight ratio of 97.5:1.0:1.5. Adding N-methyl pyrrolidone (NMP) as a solvent, stirring to form a slurry with a solid content of 0.75. Uniformly coating the slurry onto a front surface of the second positive current collector 431, drying at 90° C. to form the second positive active layer 433. Then, cold pressing the product to a compacted density of 4.0 g/cm³, thereby forming the second positive electrode plate 43. The weight of effective substance on the second positive current collector 431 is 180 g/m².

Preparation of the bipolar electrode plate 45: selecting a conducting polymeric film with a thickness of 12 µm. A copper layer and an aluminum layer are respectively formed on both sides of the conducting polymeric film by vacuum deposition or other film forming process to form a current collector 451. The thickness of the copper layer is 0.5 µm, and the thickness of the aluminum layer is 0.5 µm. Mixing a graphite, a conductive carbon black (Super P), and a styrene butadiene rubber (SBR) at a weight ratio of 96:1.5:2.5. Adding deionized water as a solvent, stirring to form a slurry with a solid content of 0.7. Uniformly coating the slurry onto a surface of the copper layer away from the conducting polymeric film, drying at 110° C. to form the third negative active layer 453. The weight of effective substance on the copper layer is 95 g/m². Then, mixing a lithium cobaltate (LiCoO₂), a conductive carbon black (Super P), and a polyvinylidene fluoride (PVDF) at a weight ratio of 97.5:1.0:1.5. Adding N-methyl pyrrolidone (NMP) as a solvent, stirring to form a slurry with a solid content of 0.75. Uniformly coating the slurry onto a surface of the aluminum layer away from the conducting polymeric film, drying at 90° C. to form the third positive active layer 455. The weight of effective substance on the aluminum layer is 180 g/m². At last, cold pressing the product to a compacted density of 2.0 g/cm³, thereby forming the bipolar electrode plate 45.

Selection of the separator 47: the same as that of COMPARATIVE EMBODIMENT 1.

Preparation of the electrolyte: the same as that of COMPARATIVE EMBODIMENT 1.

Preparation of the battery: stacking a second negative electrode plate 41, ten layers of the separators 47, nine layers of the bipolar electrode plates 45, and a second positive electrode plate 43 to form the electrode assembly 40. Each separators 47 and each bipolar electrode plates 45 are alternatively arranged. Coating sealant on a periphery of each electrode plates to seal the electrode assembly 40. Then, sealing top and side edges of the electrode assembly 20, and reserving an opening on the electrode assembly 40. Further, filling the electrode assembly 20 with the electrolyte by the opening. Then, sealing the opening, and then encapsulating and formatting the electrode assembly 20 to obtain the battery. In the formation of the electrode assembly 40, the electrode assembly 40 is charged to 33 V with a constant current of 0.02 C, then the electrode assembly 40 is charged to 36 V with a constant current of 0.1 C.

Comparative Embodiment 3

A battery of COMPARATIVE EMBODIMENT 3 includes ten batteries of COMPARATIVE EMBODIMENT 1. Ten batteries of COMPARATIVE EMBODIMENT 1 are connected by serial and parallel connection to form the battery of COMPARATIVE EMBODIMENT 3. In COMPARATIVE EMBODIMENT 3, the battery of COMPARATIVE EMBODIMENT 3 includes two battery packs, and each battery packs includes five batteries of COMPARATIVE EMBODIMENT 1. The serial and parallel connection means that five batteries in the battery pack are connected in series, then two battery packs are connected in parallel. The capacity of the battery is 4 Ah, and the output voltage of the battery is 18V.

Embodiment 1

Referring to FIGS. 2, 3, 4 and 6, the electrode assembly 10 includes an electrode subassembly 15 including a first electrode plate 11 and a second electrode plate 13. The electrode subassembly 15 winds to form the electrode assembly 10. The first electrode plate 11 includes a first electrode plate unit 12. The first electrode plate unit 12 includes a bipolar current collector 121, a first active layer 123, and a second active layer 125. The bipolar current collector 121 is disposed between the first active layer 123 and the second active layer 125. The first active layer 123 is electrically connected to the second active layer 125. The second electrode plate 13 includes a composite current collector 131, a third active layer 133, and a fourth active layer 135. The composite current collector 131 is disposed between the third active layer 133 and the fourth active layer 135. The third active layer 133 is electrically insulated from the fourth active 135.

Preparation of first electrode plate unit 12: selecting a conducting polymeric film. The conducting polymeric film has a thickness of 12 μm. A copper layer (the second metallic layer 1215) and an aluminum layer (the first metallic layer 1213) are respectively formed on both sides of the conducting polymeric film by vacuum deposition or other film forming process to form the bipolar current collector 121. The copper layer has a thickness of 0.5 μm, and the aluminum layer has a thickness of 0.5 μm. Mixing a lithium cobaltate ($LiCoO_2$), a conductive carbon black (Super P), and a polyvinylidene fluoride (PVDF) at a weight ratio of 97.5:1.0:1.5. Adding N methyl pyrrolidone (NMP) as a solvent, stirring to form a slurry with a solid content of 0.75. Uniformly coating the slurry onto a surface of the aluminum layer away from the conducting polymeric film, drying at 90° C. to form the first active layer 123 such that the weight of effective substance on the aluminum layer is 180 $g/m^2$. Then, mixing a graphite, a conductive carbon black (Super P), a styrene butadiene rubber (SBR) at a weight ratio of 96:1.5:2.5. Adding deionized water as a solvent, stirring to form a slurry with a solid content of 0.7. Uniformly coating the slurry onto a surface of the copper layer away from the conducting polymeric film, drying at 110° C. to form the second active layer 125. The weight of effective substance on the copper layer is 95 $g/m^2$. At last, cold pressing the product to a compacted density of 2.0 $g/cm^3$, thereby forming the first electrode plate unit 12.

Preparation of the second electrode plate 13: selecting a PET (polyethylene terephthalate) film. The thickness of the PET film is 12 μm. A copper layer (the fourth metallic layer 1315) and an aluminum layer (the third metallic layer 1313) are respectively formed on both sides of the PET film by vacuum deposition or other film forming process to form the composite current collector 131. The thickness of the copper layer is 0.5 μm, and the thickness of the aluminum layer is 0.5 μm. Mixing a lithium cobaltate ($LiCoO_2$), a conductive carbon black (Super P), and a polyvinylidene fluoride (PVDF) at a weight ratio of 97.5:1.0:1.5. Adding N-methyl pyrrolidone (NMP) as a solvent, stirring to form a slurry with a solid content of 0.75. Uniformly coating the slurry onto a surface of the aluminum layer away from the PET film, drying at 90° C. to form the third active layer 133. The weight of effective substance on the aluminum layer is 180 $g/m^2$. Then, mixing a graphite, a conductive carbon black (Super P), a styrene butadiene rubber (SBR) at a weight ratio of 96:1.5:2.5. Adding deionized water as a solvent, stirring to form a slurry with a solid content of 0.7. Uniformly coating the slurry onto a surface of the copper layer away from the PET film, drying at 110° C. to form the fourth active layer 135. The weight of effective substance on the copper layer is 95 $g/m^2$. At last, cold pressing the product to a compacted density of 2.0 $g/cm^3$, thereby forming the second electrode plate 13.

Selection of separators: two PE films are respectively to function as the separator. The thickness of the PE film is 15 μm.

Preparation of the electrolyte: the same as that of the COMPARATIVE EMBODIMENT 1.

Preparation of battery 100: stacking and winding a second electrode plate 13, a first separators 14, a first electrode plate 11, and a second separator 16 to form the electrode assembly 10. Coating sealant on a periphery of each electrode plates to seal the electrode assembly 10. Then, sealing top and side edges of the electrode assembly 10, and reserving an opening on the electrode assembly 10. Further, filling the electrode assembly 10 with the electrolyte via the opening. Then, sealing the opening, and then encapsulating and formatting the electrode assembly 10 to obtain the batter 100. In the formation of the electrode assembly 10, the electrode assembly 10 is charged to 6.6 V with a constant current of 0.02 C, then the electrode assembly 10 is charged to 7.2 V with a constant current of 0.1 C. The battery 100 is a polymer Li-ion battery.

The performance features of the cells prepared by methods recited in the Comparative embodiments and Embodiments of the present disclosure are measured and discussed as follows:

Compared to the COMPARATIVE EMBODIMENT 1, the battery 100 prepared by the method of Embodiment 1 has an output voltage twice of that of the battery prepared by the method of COMPARATIVE EMBODIMENT 1.

Compared to the COMPARATIVE EMBODIMENT 2, the battery of Embodiment 1 has a wound structure, and the battery of COMPARATIVE EMBODIMENT 2 has a stacked structure. In COMPARATIVE EMBODIMENT 2, the battery has high energy density by increasing the number of the electrode plates connected in series, which will lead to a high output voltage of individual electrode assembly 20, and a small capacity of individual electrode assembly 20.

Embodiment 2

Difference between the battery of Embodiment 2 and Embodiment 1 is the preparation of the battery 100.

Preparation of battery 100: stacking and winding a second electrode plate 13, a first separator 14, a first electrode plate 11, and a second separator 16 to form the electrode assembly 10. Coating Sealant on a periphery of each electrode plates to seal the electrode assembly 10, and reserving an opening on the electrode assembly 10. Putting the electrode assembly 10 into a cylindrical shell, and filling the electrode assembly 10 with the electrolyte via the opening, sealing the opening, and then sealing the electrode assembly 10 and the cylindrical shell. And then, formatting the electrode assembly 10 to obtain the battery 100. In the formation of the electrode assembly 10, the electrode assembly 10 is charged to 6.6 V with a constant current of 0.02 C, then the electrode assembly 10 is charged to 7.2 V with a constant current of 0.1 C. The battery 100 is a cylindrical Li-ion battery.

Compared to the COMPARATIVE EMBODIMENT 1, the battery 100 of Embodiment 2 has an output voltage twice of that of the battery of COMPARATIVE EMBODIMENT 1.

Embodiment 3

Figure 5:
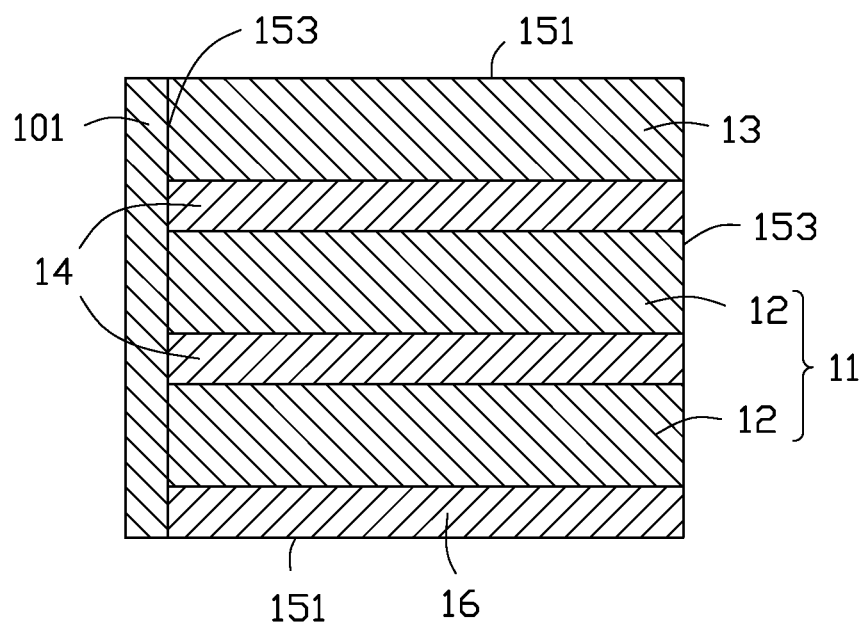
FIG. 5 is a cross-sectional view of another embodiment of a portion of an electrode subassembly.

Referring to FIG. 5, the difference between the battery of Embodiment 3 and Embodiment 1 is the first electrode plate 11. In Embodiment 3, the first electrode plate 10 includes two first electrode plate units 12.

Preparation of the first electrode plate unit 12: the same as that of EMBODIMENT 1.

Preparation of the second electrode plate 13: the same as that of EMBODIMENT 1.

Selection of separator: the same as that of EMBODIMENT 1.

Preparation of the electrolyte: the same as that of EMBODIMENT 1.

Preparation of the battery 100: stacking and winding a second electrode plate 13, two layers of the first separators 14, two layers of the first electrode plate units 12, and a second separator 16 to form the electrode assembly 10. Each first separators 14 and each first electrode plate units 12 are alternatively arranged. Coating Sealant on a periphery of each electrode plates to seal the electrode assembly 10. Then, sealing top and side edges of the electrode assembly 10, and reserving an opening on the electrode assembly 10. Further, filling the electrode assembly 10 with the electrolyte by the opening. Then, sealing the opening, and then encapsulating and formatting the electrode assembly 10 to obtain the battery 100. In the formation of the electrode assembly 10, the electrode assembly 10 is charged to 9.9 V with a constant current of 0.02 C, then the electrode assembly 10 is charged to 10.8 V with a constant current of 0.1 C. The battery 100 is a polymer Li-ion battery.

Compared to the COMPARATIVE EMBODIMENT 1, the output voltage of the battery 100 of Embodiment 3 is three times of that of the battery of COMPARATIVE EMBODIMENT 1.

Embodiment 4

Differences between the battery of Embodiment 4 and Embodiment 1 are the first electrode plate unit 12 and the second electrode plate 13. In Embodiment 4, an electrolyte layer is coated on the first electrode plate unit 12, and an electrolyte layer is coated on the second electrode plate 13. The electrolyte layer is gel electrolyte.

Preparation of the first electrode plate unit 12: the difference between the battery of Embodiment 4 and Embodiment 1 is that the gel electrolyte is coated on the first active layer 123 in Embodiment 4.

Preparation of the second electrode plate 13: the difference between the battery of Embodiment 4 and Embodiment 1 is that the gel electrolyte is coated on the third active layer 133 in Embodiment 4.

Selection of separator: the same as that of EMBODIMENT 1.

Preparation of the battery 100: stacking and winding a second electrode plate 13, a first separator 14, a first electrode plate 11, and a second separator 16 to form the electrode assembly 10. Coating sealant on a periphery of each electrode plates to seal the electrode assembly 10, and sealing top and side edges of the electrode assembly 10. Then, encapsulating and formatting the electrode assembly 10 to obtain the battery 100. In the formation of the electrode assembly 10, the electrode assembly 10 is charged to 6.6V with a constant current of 0.02 C, then the electrode assembly 10 is charged to 7.2 V with a constant current of 0.1 C. The battery 100 is a polymer Li-ion battery.

Compared to the COMPARATIVE EMBODIMENT 1, the output voltage of the battery 100 of Embodiment 4 is twice of that of the battery of COMPARATIVE EMBODIMENT 1.

Embodiment 5

Difference between the battery of Embodiment 5 and Embodiment 1 is the first electrode plate 11. In Embodiment 5, the first electrode plate 10 includes four first electrode plate units 12.

Preparation of the first electrode plate unit 12: the same as that of EMBODIMENT 1.

Preparation of the second electrode plate 13: the same as that of EMBODIMENT 1.

Section of separator: the same as that of EMBODIMENT 1.

Preparation of the electrolyte: the same as that of EMBODIMENT 1.

Preparation of the battery 100: stacking and winding a second electrode plate 13, four layers of the first separators 14, four layers of the first electrode plate units 12, and a second separator 16 to form the electrode assembly 10. Each of the first separators 14 and each of the first electrode plate units 12 are alternatively arranged. Coating sealant on a periphery of each electrode plates to seal the electrode assembly 10. Then, sealing top and side edges of the electrode assembly 10, and reserving an opening on the electrode assembly 10. Further, filling the electrode assembly 10 with the electrolyte by the opening. Then, sealing the opening, and then encapsulating and formatting the electrode assembly 20 to obtain the battery 100. In the formation of the electrode assembly 10, the electrode assembly 10 is charged to 16.5 V with a constant current of 0.02 C, then the electrode assembly 10 is charged to 18 V with a constant current of 0.1 C. The capacity of the battery 100 is 4 Ah, and the output voltage of the battery 100 is 18V.

Compared to the COMPARATIVE EMBODIMENT 3, the battery 100 of EMBODIMENT 5 has the same battery capacity as the battery 100 of COMPARATIVE EMBODIMENT 3. In COMPARATIVE EMBODIMENT 3, batteries are connected by serial and parallel connection, which causes the energy density of the battery of COMPARATIVE EMBODIMENT 3 to be lower than the battery of EMBODIMENT 5, and the battery of COMPARATIVE EMBODIMENT 3 has a higher manufacturing cost than the battery of the EMBODIMENT 5.

In summary, the electrode assembly 10 includes the electrode subassembly 15 formed by winding the first electrode plate 11 and the second electrode plate 13. The first active layer 123 of the first electrode plate 11 is electrically connected to the second active layer 125 of the first electrode plate 11, and the third active layer 133 of the second electrode plate 13 is electrically insulated from the fourth active 135 of the second electrode plate 13 to create a series connection inside the electrode assembly 10, thereby increasing the output voltage of the battery 100. Thus, the usage of the internal space of the battery is maximized to obtain a battery 100 with a high energy density.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An electrode assembly comprising an electrode subassembly comprising a first electrode plate and a second electrode plate, wherein the electrode subassembly winds to form the electrode assembly;

the first electrode plate comprises a first electrode plate unit, the first electrode plate unit comprises a bipolar current collector, a first active layer, and a second active layer, the bipolar current collector being disposed between the first active layer and the second active layer, wherein the first active layer is electrically connected to the second active layer; and, the second electrode plate comprises a composite current collector, a third active layer, and a fourth active layer, the composite current collector being disposed between the third active layer and the fourth active layer, wherein the third active layer is electrically insulated from the fourth active layer, wherein the bipolar current collector comprises a conducting layer, a first metallic layer, and a second metallic layer; the conducting layer is disposed between the first metallic layer and the second metallic layer; and, the composite current collector comprises an insulating layer, a third metallic layer, and a fourth metallic layer; the insulating layer is disposed between the third metallic layer and the fourth metallic layer.

2. The electrode assembly of claim 1, wherein the electrode assembly further comprises a sealing portion, and the sealing portion seals sides of the electrode assembly.

3. The electrode assembly of claim 1, wherein the electrode assembly further comprises a first separator and a second separator;
the first separator is disposed between the first electrode plate and the second electrode plate; and,
the second separator is disposed on a surface of the first electrode plate away from the second electrode plate.

4. The electrode assembly of claim 3, wherein the first electrode plate comprises a plurality of first electrode plate units, the first separator is disposed between two adjacent first electrode plate units of the plurality of first electrode plate units.

5. The electrode assembly of claim 1, wherein the second electrode plate is located on an outer side of the electrode assembly; the first active layer is farther away from the second electrode plate than the second active layer; the fourth active layer is farther away from the first electrode plate than the third active layer; and, the second active layer has a polarity opposite to the polarity of the third active layer.

6. The electrode assembly of claim 1, wherein the first active layer has a same polarity as the third active layer, the second active layer has a same polarity as the fourth active layer; and, the polarity of the first active layer is opposite to the polarity of the second active layer.

7. The electrode assembly of claim 1, wherein the electrode assembly further comprises a first terminal and a second terminal; the first terminal is disposed on the third metallic layer, and the second terminal is disposed on the fourth metallic layer.

8. The electrode assembly of claim 1, wherein the electrode assembly further comprises a first electrolyte layer and a second electrolyte layer; the first electrolyte layer is disposed between the first active layer and the fourth active layer; and, the second electrolyte layer is disposed between the second active layer and the third active layer.

9. The electrode assembly of claim 1, wherein the second electrode plate is located on an inner side of the electrode assembly, the first active layer is farther away from the second electrode plate than the second active layer, the fourth active layer is farther away from the first electrode plate than the third active layer, the second active layer has a polarity opposite to that of the third active layer.

10. A battery, comprising an electrode assembly and a housing accommodating the electrode assembly; wherein the electrode assembly comprises an electrode subassembly comprising a first electrode plate and a second electrode plate, the electrode subassembly winds to form the electrode assembly;

the first electrode plate comprises a first electrode plate unit, the first electrode plate unit comprises a bipolar current collector, a first active layer, and a second active layer, the bipolar current collector being disposed between the first active layer and the second active layer, wherein the first active layer is electrically connected to the second active layer; and the second electrode plate comprises a composite current collector, a third active layer, and a fourth active layer, the composite current collector being disposed between the third active layer and the fourth active layer, wherein the third active layer is electrically insulated from the fourth active layer, wherein the bipolar current collector comprises a conducting layer, a first metallic layer, and a second metallic layer; the conducting layer is disposed between the first metallic layer and the second metallic layer; and, the composite current collector comprises an insulating layer, a third metallic layer, and a fourth metallic layer; the insulating layer is disposed between the third metallic layer and the fourth metallic layer.

11. The battery of claim 10, wherein the electrode assembly further comprise a sealing portion, the sealing portion seals sides of the electrode assembly.

12. The battery of claim 10, wherein the electrode assembly further comprises a first separator and a second separator;
the first separator is disposed between the first electrode plate and the second electrode plate; and,
the second separator is disposed on a surface of the first electrode plate away from the second electrode plate.

13. The battery of claim 12, wherein the first electrode plate comprises a plurality of first electrode plate units, the first separator is disposed between two adjacent first electrode plate units of the plurality of first electrode plate units.

14. The battery of claim 10, wherein the second electrode plate is located on an outer side of the electrode assembly; the first active layer is farther away from the second electrode plate than the second active layer; the fourth active layer is farther away from the first electrode plate than the third active layer; and, the second active layer has a polarity opposite to that of the third active layer.

15. The battery of claim 10, wherein the first active layer has a same polarity as the third active layer, the second active layer has a same polarity as the fourth active layer; and, the polarity of the first active layer is opposite to the polarity of the second active layer.

16. The battery of claim 10, wherein the electrode assembly further comprises a first terminal and a second terminal; the first terminal is disposed on the third metallic layer, and the second terminal is disposed on the fourth metallic layer.

17. The battery of claim 10, wherein the electrode assembly further comprises a first electrolyte layer and a second electrolyte layer; the first electrolyte layer is disposed between the first active layer and the fourth active layer; and, the second electrolyte layer is disposed between the second active layer and the third active layer.

18. The battery of claim 10, wherein the second electrode plate is located an inner side of the electrode assembly, the first active layer is farther away from the second electrode plate than the second active layer, the fourth active layer is farther away from the first electrode plate than the third active layer, and the second active layer has a polarity opposite to the polarity of the third active layer.

* * * * *